(12) United States Patent
Persson et al.

(10) Patent No.: US 9,334,621 B2
(45) Date of Patent: May 10, 2016

(54) ECCENTRIC SHAFT ASSEMBLY HAVING FIXED AND MOVABLE ECCENTRIC MASSES

(71) Applicant: Dynapac Compaction Equipment AB, Karlskrona (SE)

(72) Inventors: Andreas Persson, Karlskrona (SE); Hans Christensen, Karlskrona (SE)

(73) Assignee: Dynapac Compaction Equipment AB, Karlskrona (SE)

( * ) Notice: Subject to any disclaimer, the term of this patent is extended or adjusted under 35 U.S.C. 154(b) by 0 days.

(21) Appl. No.: 14/543,522

(22) Filed: Nov. 17, 2014

(65) Prior Publication Data

US 2015/0139731 A1 May 21, 2015

(30) Foreign Application Priority Data

Nov. 15, 2013 (SE) ........................................ 1300711

(51) Int. Cl.
| | |
|---|---|
| *E02D 3/074* | (2006.01) |
| *E01C 19/28* | (2006.01) |
| *E01C 19/38* | (2006.01) |
| *F16C 3/18* | (2006.01) |
| *E02D 3/026* | (2006.01) |

(52) U.S. Cl.
CPC .............. *E02D 3/074* (2013.01); *E01C 19/286* (2013.01); *E01C 19/38* (2013.01); *E02D 3/026* (2013.01); *F16C 3/18* (2013.01); *Y10T 74/2111* (2015.01)

(58) Field of Classification Search
CPC . E01C 19/264; E01C 19/002; E01C 19/4866; E01C 19/286; E01C 19/38; E02D 3/0265; E02D 3/032; E02D 3/039; E02D 3/046; E02D 3/074; F16C 3/18
See application file for complete search history.

(56) References Cited

U.S. PATENT DOCUMENTS

| 3,722,381 A | 3/1973 | Tuneblom | |
|---|---|---|---|
| 3,892,496 A * | 7/1975 | Lebrero Martinez . | E01C 19/286 404/117 |

(Continued)

FOREIGN PATENT DOCUMENTS

| AU | 708103 B2 | 7/1999 |
|---|---|---|
| CN | 102995521 A | 3/2013 |

(Continued)

OTHER PUBLICATIONS

International-Type Search Report of the Swedish Patent Office dated Jun. 12, 2014 of Swedish patent application 1300711-7 on which this application is based.

*Primary Examiner* — Abigail A Risic
(74) *Attorney, Agent, or Firm* — Walter Ottesen, P.A.

(57) ABSTRACT

An eccentric shaft for a compacting machine is rotatable about a rotational axis and includes a fixed and movable eccentric mass where the movable eccentric mass cooperates with the fixed eccentric mass in one of the directions of rotation of the eccentric shaft to partly balance the fixed eccentric mass in the other rotation direction of the eccentric shaft. At least one section of the fixed eccentric mass shows a maximal radial extension (UB) in relation to the rotational axis, limited by an arc-shaped curve, which extends to a circle shape, with the diameter (D) showing a distance (A), between the point (P) on the circle-shaped curve that is located closest to the point of intersection of the rotational axis and the section plane, and the point of intersection, from 0 up to 0.1(D).

9 Claims, 5 Drawing Sheets

(56) References Cited

U.S. PATENT DOCUMENTS

| | | | |
|---|---|---|---|
| 3,896,677 A | 7/1975 | Larson | |
| 3,913,409 A * | 10/1975 | Opderbeck | B06B 1/167 74/52 |
| 4,749,305 A * | 6/1988 | Brown | E01C 19/286 366/116 |
| 4,759,659 A | 7/1988 | Copie | |
| 6,224,293 B1 * | 5/2001 | Smith | B06B 1/164 404/117 |
| 8,967,910 B2 * | 3/2015 | Hansen | B06B 1/00 404/113 |
| 2004/0005191 A1 * | 1/2004 | Geier | E01C 19/286 404/117 |
| 2004/0120767 A1 * | 6/2004 | Potts | B06B 1/16 404/117 |
| 2011/0290048 A1 * | 12/2011 | Stein | E01C 19/286 74/61 |
| 2012/0201602 A1 * | 8/2012 | Sina | E01C 19/286 404/75 |

FOREIGN PATENT DOCUMENTS

| | | |
|---|---|---|
| GB | 2139736 A | 11/1984 |
| WO | 2014/175787 A1 | 10/2014 |

* cited by examiner

ECCENTRIC SHAFT ASSEMBLY HAVING FIXED AND MOVABLE ECCENTRIC MASSES

CROSS REFERENCE TO RELATED APPLICATION

This application claims priority of Swedish patent application no. 1300711-7, filed Nov. 15, 2013, the entire content of which is incorporated herein by reference.

FIELD OF THE INVENTION

The invention is directed to a configuration of eccentric shafts of the dual amplitude type intended for use in compacting machines such as road rollers, for example. The eccentric shafts have a high eccentric moment in one rotation direction and a lower eccentric moment in the other rotation direction. The eccentric shafts include a fixed and movable eccentric mass. The movable eccentric mass is arranged to cooperate with the fixed eccentric mass in one rotation direction of the eccentric shaft and to partly balance the fixed eccentric mass in the other rotation direction of the eccentric shaft. The eccentric shafts are configured for start with low start torque. The latter characteristic contributes to reduce the fuel consumption of the compacting machines. The eccentric shafts of rollers for asphalt compaction are frequently started and stopped during the compacting work. This is why the eccentric shaft of the invention is especially suitable for these types of compacting machines, but the invention is also suitable for soil compacting machines. The eccentric shafts reduce the need of starting torque and can be one of several factors which make it possible to install less powerful combustion engines in the compacting machines. The lower need of starting torque can also make it possible to reduce the dimensions of the power distributing systems of the compacting machines. This will decrease the manufacturing cost of the systems. The eccentric shaft is especially suitable for cassette-assembly.

BACKGROUND OF THE INVENTION

U.S. Pat. No. 3,722,381 discloses a pair of eccentric shafts of the dual amplitude type arranged in the drum of a road roller. The eccentric masses of the eccentric shafts are identically configured. The eccentric shafts are arranged in cassettes, connected to the gable ends of the drum. A hydraulic motor drives/rotates one of the eccentric shafts which, in turn, transmit the rotation movement to the other eccentric shaft via an intermediate shaft. The eccentric shafts connection to the intermediate shaft is arranged in a way that gives the eccentric masses synchronized positions during the rotation. FIG. 1 of the patent shows a high amplitude position in which both the fixed and movable eccentric masses of the eccentric shafts are cooperating, that is, the position which the eccentric masses are intended to take in one of the rotation directions of the eccentric shafts. The rotating and cooperating eccentric masses are intended to actuate the drum of the roller to vibrate with highest possible amplitude in this position. FIG. 2 shows the low-amplitude-position which the movable eccentric masses take in the other rotation direction of the eccentric shafts. An imagined section of any of the eccentric shafts and its eccentric masses in the cooperating position shows a radial extension limited by a 5-sided geometrical shape. A drawback of the 5-sided shape is that it is not optimal from the viewpoint of mass-moment of inertia. It is also observed in the imagined section that a great deal of the section is taken up by balanced masses which does not contribute to the eccentric characteristics of the eccentric shaft but instead to an unwanted increasing of the mass-moment of inertia of the eccentric shaft. The same applies to the rings connecting and making the movable eccentric masses pivotal relative to the fixed eccentric masses. In both cases, the consequence is that the eccentric shaft is unnecessarily power and energy consuming during start up due to the shaft's high mass-moment of inertia.

FIG. 3 of the Chinese patent publication CN102995521 shows an eccentric shaft of dual-amplitude-type. The shaft is shown in a low-amplitude position in which its movable eccentric mass (at the bottom) partly balances the fixed eccentric mass (on top). The aforementioned problem, that parts of the eccentric shaft section do not contribute to the eccentric characteristics of the eccentric shaft, is solved by the fixed eccentric mass at the same time having a "carrying" function. A section through the eccentric masses would probably show that the sections are externally limited by circle shapes. The circle shapes provide a low mass-moment of inertia but the locations of the circle shapes, in relation to the point of intersection between the rotational axis and the section plane, are not optimal in this aspect. The circle shapes appear to be located at a distance from the rotation shaft that exceeds the diameter of the circle shape. In an imagined high-amplitude position, in which the movable and fixed eccentric masses are co-operating, it is also not optimal to have the eccentric masses distributed on two circle shapes in the section.

SUMMARY OF THE INVENTION

It is an object of the invention to provide an eccentric shaft of the dual-amplitude-type with optimally (low) mass-moment of inertia about the rotational axis it is intended to be rotated about. According to the invention, most sections of the fixed eccentric mass and movable eccentric mass of the eccentric shaft are arranged included by one circle shape when the masses are cooperating. The circle shape must be coincident with or is located in the immediate vicinity of the point of intersection of the rotational axis and the section plane.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
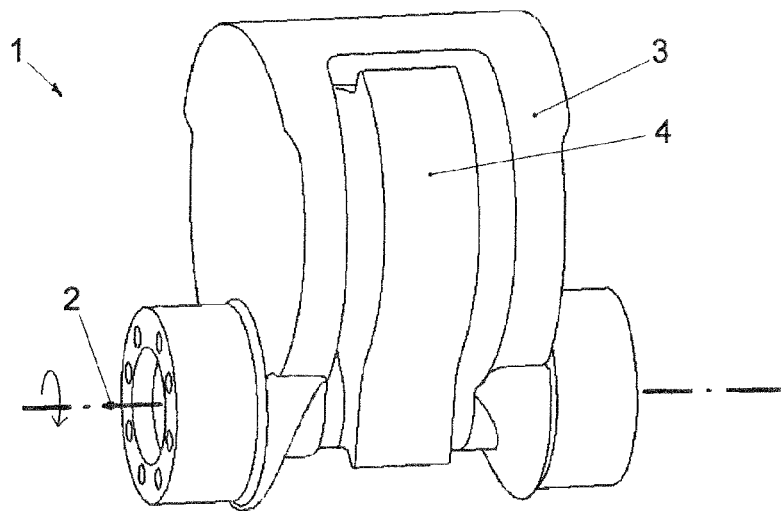
FIG. 1 shows an isometric view of an eccentric shaft according to the present invention in a high-amplitude-position.
Figure 10:
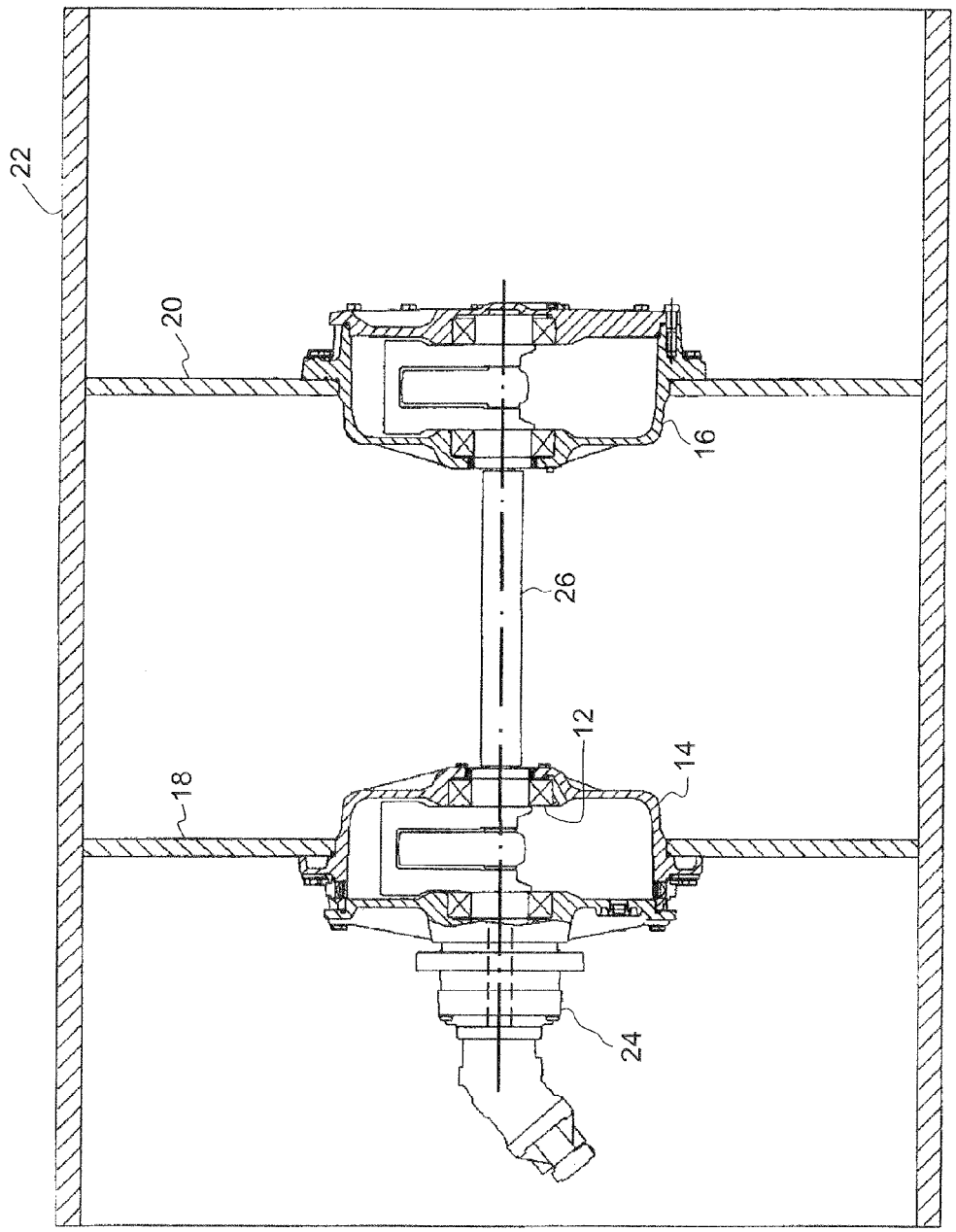

FIG. 1 shows an eccentric shaft 1 of dual-amplitude-type rotatably arranged about a rotational axis 2 in the drum of an asphalt roller (cf. FIG. 10). FIG. 1 shows an on-the-spot view of the eccentric shaft 1 when it is rotated in one of its rotation directions about the rotational axis 2. The rotation direction is clockwise and is illustrated by a curved arrow in the drawing. The eccentric shaft 1 incorporates a fixed eccentric mass 3 and a movable eccentric mass 4. The fixed eccentric mass 3 is configured as a cast component in nodular ductile iron. Both the shaft ends of the eccentric shaft 1 are connected to the fixed eccentric mass 3 and have machine finished surfaces for the bearings 12 (cf. FIG. 10) which makes the shaft 1 rotatable. The bearings are arranged in cassettes (14, 16) arranged in respective gable ends (18, 20) of the drum 22 as shown in FIG. 10.

The left hand end of the shaft is connected to a hydraulic motor 24 which rotates the shaft 1 about the rotational axis 2. The right hand shaft end is connected, via an intermediate shaft 26, to a similar eccentric shaft mounted in cassette 16 in the other gable end 20 of the drum 22. The connection is arranged in a way that gives the fixed eccentric masses equal and synchronized positions in relation to the drum 22 during the rotation of the shafts as shown in FIG. 10. The movable eccentric mass 4 is pivotally arranged about an axis that almost coincides with the rotational axis 2. The movable eccentric mass 4 pivots a small amount in relation to the fixed mass 3 and is stopped by the same when the rotation of the eccentric shaft 1 is initiated. The fixed eccentric mass 3 will push the movable eccentric mass 4 in front of itself, in the position which is shown in FIG. 1, during the continued clockwise rotation of the eccentric shaft 1. The position is adapted for its purpose and corresponds to a position in which the movable eccentric mass 4 cooperates with the fixed eccentric mass 3. The clockwise rotating eccentric shafts are in an intended way actuating the drum to vibrate and to compact the ground with highest possible amplitude.

Figure 2:
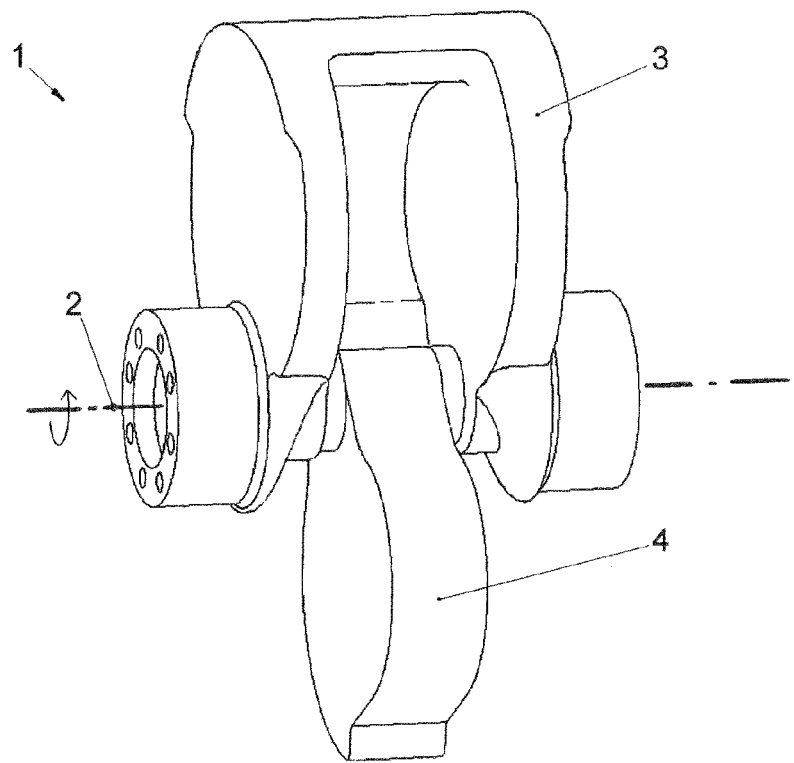
FIG. 2 shows the eccentric shaft from FIG. 1 in a low-amplitude-position.

FIG. 2 shows an on-the-spot view of the eccentric shaft 1 when it is rotated in its other rotation direction, that is, counterclockwise. When the counterclockwise rotation is initiated, the movable eccentric mass 4 will pivot almost a half revolution around its axis whereupon the pivoting thereof will be stopped by a stop dog 5 (described in connection to FIG. 7). During the continued counterclockwise rotation of the eccentric shaft 1, the stop dog 5 will actuate the movable eccentric mass 4 to follow the rotation in an assumed position which is shown in FIG. 2. The position is adapted to its purpose and corresponds to a position in which the movable eccentric mass 4 partly balances the fixed eccentric mass 3. The movable eccentric mass 4 is arranged to balance half of the fixed eccentric mass 3. The counterclockwise rotating eccentric shafts will consequently actuate the drum to vibrate with an amplitude that is half of the highest possible amplitude. It is possible to adapt the eccentric masses so that other amplitude combinations are obtained.

Figure 3:
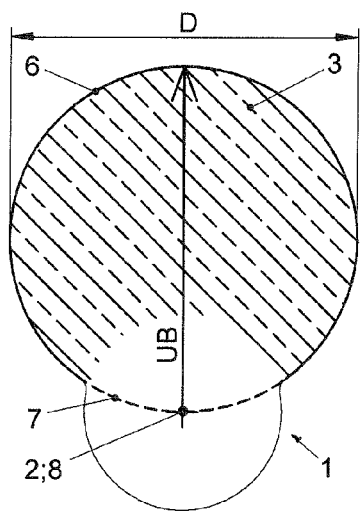
FIG. 3 shows a section of a first embodiment of the eccentric shaft from FIGS. 1 and 2.

FIG. 3 shows a section of the fixed eccentric mass 3. The section of the fixed eccentric mass 3 is shown with a combination of unbroken and broken lines in FIGS. 3 to 7. FIG. 3 shows how the maximum radial extension UB (in relation to the rotational axis 2 of a section of the fixed eccentric mass 3) is limited by an arc-shaped curve 6. The curve 6 can be extended to a circle shape 7 having a diameter D. In the embodiment, the circle shape 7 is arranged to coincide with the point of intersection 8 of the rotational axis 2 and the section plane. In the embodiment, every section of the fixed eccentric mass 3 is limited by similar circle shapes with similar diameter and location in relation to the point of intersection 8 of the rotational axis 2 and the section plane. Likewise, the arc-shaped curve 6 is constituted by a circular arc and the circle shape 7 by a circle. The embodiment gives the eccentric shaft 1 an optimally low mass-moment of inertia about the rotational axis 2.

The term "arc-shaped curve" comprises all curves that can be approximated to an arc-shaped curve while no part of the origin curve deviates more than a distance of 0.04(D) (0.04 multiplied by D) from the approximation. "D" is also in this case the diameter D for the circle shape that the approximation can be extended to.

The term "eccentric mass" refers to the unbalanced mass with the purpose of contributing to the eccentric moment of the eccentric shaft 1 when it is rotated about the rotational axis 2. Minor unbalanced masses located outside the circle shape 7, which arise from other functions such as stop dogs and the like, must be disregarded when the term is interpreted.

Figure 4:
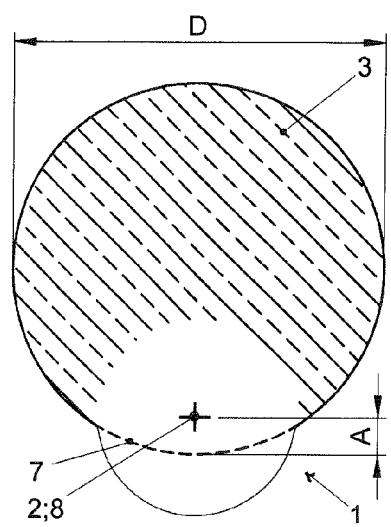
FIGS. 4 and 5 show sections of a second and third embodiment of the eccentric shaft from FIGS. 1 and 2.

FIG. 4 shows a second embodiment of the eccentric shaft 1. The section of the fixed eccentric mass 3 is, in this embodiment, arranged in a way that makes the circle shape 7, with the diameter D, located at a smallest distance A of 0.1(D) from the point of intersection 8 of the rotational axis 2 and the section plane. The location is arranged so that the point 8 is surrounded by the circle shape 7. The circle shape 7 is also in this embodiment constituted by a circle and the fixed eccentric mass 3 is arranged so that every section of it shows identical circle shapes with identical locations in relation to the point 8. The eccentric shaft 1 has an acceptable mass-moment of inertia also in this embodiment but increases in weight compared to the shaft 1 according to the first embodiment. Thus, it is less interesting to configure the eccentric mass 3 so that the distance A gets longer than 0.1(D) as this would result in an even larger increase in weight. A design with a shorter distance A than 0.1(D), and especially with a distance A of 0.05(D) or less, will however result in good characteristics. The latter distance can be a consequence of extensive manufacturing tolerances for an eccentric shaft 1 which has been configured according to the first embodiment in FIG. 3.

Figure 5:
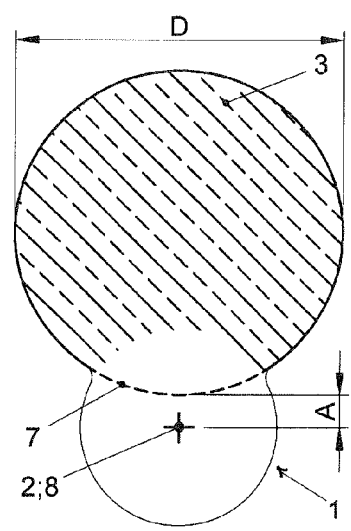

FIG. 5 shows a third embodiment of the eccentric shaft 1. The section of the fixed eccentric mass 3 is also in this embodiment arranged in a way that makes the circle shape 7, with the diameter D, located at a smallest distance A of 0.1(D) from the point of intersection 8 between the rotational axis 2 and the section plane. The location is arranged so that the point 8 is outside of the circle shape 7. The circle shape 7 is also in this embodiment constituted by a circle and the fixed eccentric mass 3 is arranged so that every section of it shows identical circle shapes with identical locations in relation to the point 8. The eccentric shaft 1 gets an acceptable mass-moment of inertia also in this embodiment but the bending stress increases in the carrying part of the fixed eccentric mass 3. Thus, it is less interesting to configure the eccentric mass 3 in a way that makes the distance A longer than 0.1(D) as this would result in even larger increase of the bending stress. The configuration according to the third embodiment is especially advantageously when a low weight of the eccentric shaft 1 is of higher priority than an optimal low mass-moment of inertia.

Figure 6:
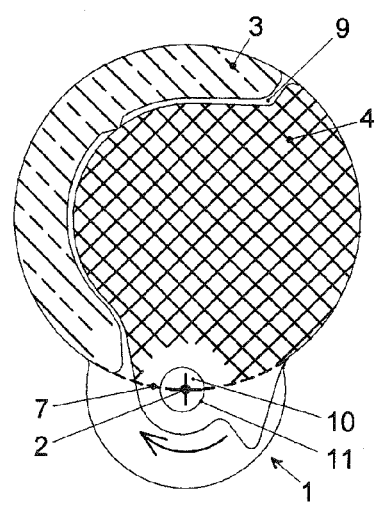
FIG. 6 shows a section of the eccentric shaft from FIG. 1 in a high-amplitude-position.

FIG. 6 shows how the fixed eccentric mass 3 in FIG. 1 pushes the movable eccentric mass 4 in front of itself when the masses (3, 4) are cooperating during clockwise rotation of the eccentric shaft 1 about the rotational axis 2. The section of the movable eccentric mass 4 is shown with a cross-hatched pattern in FIGS. 6 and 7. The fixed eccentric mass 3 incorporates a cut-out portion in the shape of a recess 9. The recess 9 and the movable eccentric mass 4 are arranged so that the section of the movable eccentric mass 4 is contained by a projection of the circle shape 7 in the section. The recess 9 and the movable eccentric mass 4 are arranged so that every section of the mass 4 is included by projections of the circle shape 7 in the sections. The movable eccentric mass 4 is configured as a plate segment but can also be configured as a cast component. The latter design can make it possible to design the mass 4 so that it almost completely fills up the recess 9. The movable eccentric mass 4 is pivotally mounted on a pin shaft 10 extending in length in the same direction as the rotational axis 2. The pin shaft 10 must be arranged with as little diameter as possible as it is not contributing to the eccentricity of the eccentric shaft 1 but, on the other hand, to the mass-moment of inertia of the shaft 1. The pin shaft 10 has a diameter that is essentially smaller than the diameter of the ends of the eccentric shaft. The center shaft of the pin shaft 10 is parallelly offset from the rotational axis 2 by a small amount in order to generate favorable adjusting forces during the transition between the low and high amplitude positions. The offset is arranged in a way that gives the centrifugal force, which is acting on the center of gravity of the movable eccentric mass 4, a minor component force which actuates the mass 4 to assume the high or low amplitude position during the adjusting. The eccentric shaft 1 and the movable eccentric mass 4 are penetrated by a hole 11 in the same direction as the rotational axis 2. The movable eccentric mass 4 is provided with a pivotal connection to the eccentric shaft 1 by the pin shaft 10 which is pressed through the holes 11 to a suitable position. The holes 11 are adapted to achieve a running fit between the pin shaft 10 and the movable eccentric mass 4 and a press fit between the pin shaft 10 and the eccentric shaft 1.

Figure 7:
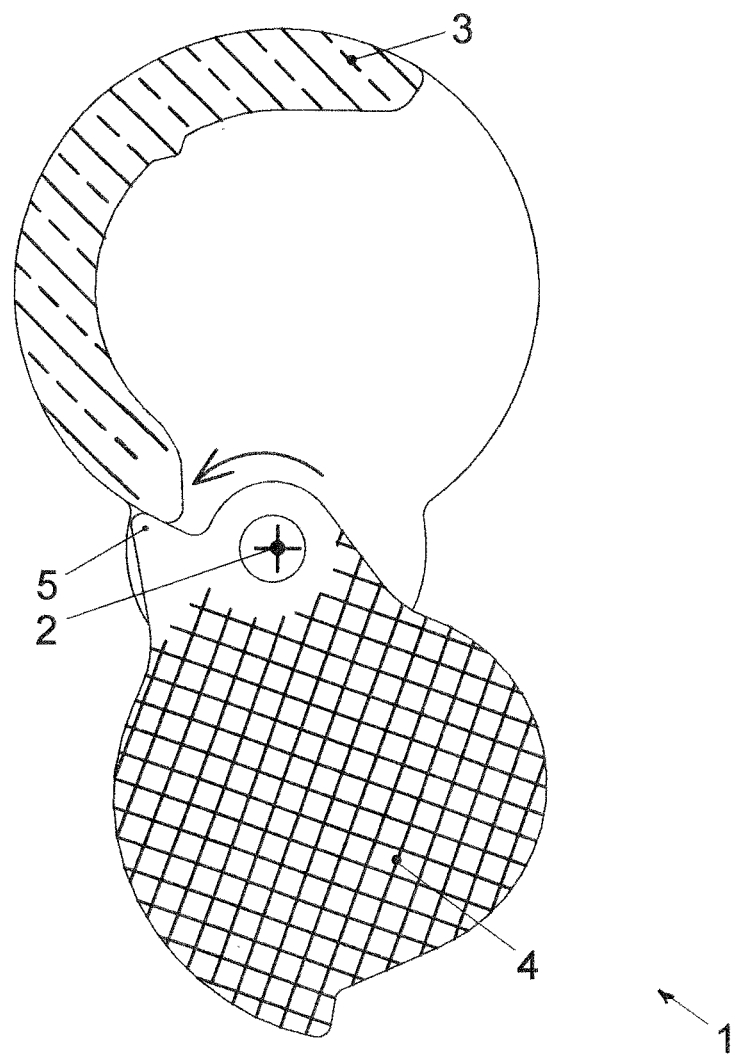
FIG. 7 shows a section of the eccentric shaft from FIG. 2 in a low-amplitude-position.

FIG. 7 shows how the stop dog 5 actuates the movable eccentric mass 4 to follow the counterclockwise rotation of the eccentric shaft 1 about the rotational axis 2. The stop dog 5 is part of the plate segment which constitutes the movable eccentric mass 4. The stop dog 5 is arranged to hit a stop head connected to the fixed eccentric mass 3.

Figure 8:
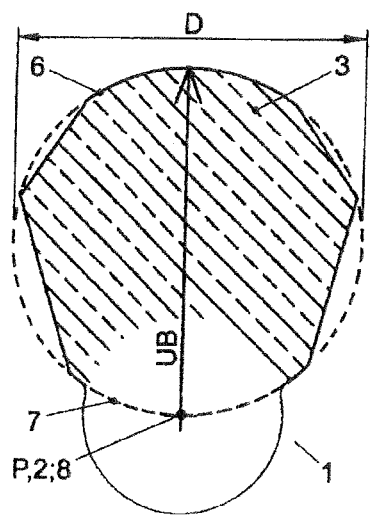
FIG. 8 is a schematic showing an imaginary arc-shaped curve defined by points and/or segments of the outer periphery of the fixed eccentric mass.

FIG. 8 shows an "almost optimal" section of a fixed eccentric mass 3. Some parts of the section are not delimited by an arc-shaped curve 6. The maximal radial extension UB of the section is limited by a maximal arc-shaped curve 6 having a diameter D and being defined by points and/or segments of the outer periphery of the fixed eccentric mass 3.

Figure 9:
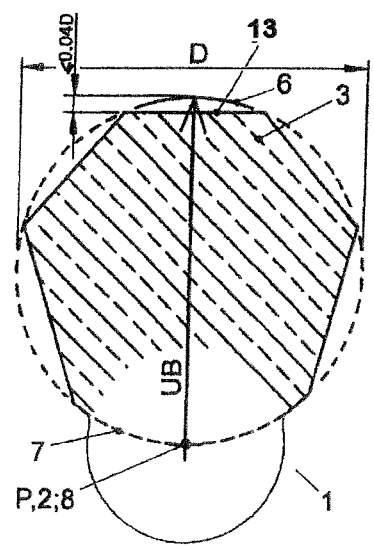
FIG. 9 is a schematic showing that the imaginary arc-shaped curve is an approximation origin curve of the outer periphery of the fixed eccentric mass; and, FIG. 10 is a schematic showing the eccentric shaft mounted in the drum of a compacting machine or road roller.

FIG. 9 shows a section of the fixed eccentric mass 3 with its maximal radial extension UB delimited by an imaginary arc-shaped curve 6. The arc-shaped curve 6 is an approximation of the origin curve 13 and, as in FIG. 8, is defined by points and/or segments of the outer periphery of the fixed eccentric mass 3.

It is quite possible to configure the fixed eccentric mass "spool shaped" by letting its sections be delimited by circle shapes with varying diameters and/or locations in relation to the point of intersection between the rotational axis and the section plane. The sections of the movable eccentric mass shall in such cases be designed to be included by the circle shape which shows the largest diameter. "Spool shaped" eccentric shafts are, however, very much more complicated to manufacture than the shafts which are shown in the present application.

It is understood that the foregoing description is that of the preferred embodiments of the invention and that various changes and modifications may be made thereto without departing from the spirit and scope of the invention as defined in the appended claims.

What is claimed is:

1. An eccentric shaft assembly for a compacting machine, the eccentric shaft assembly comprising:
   an eccentric shaft rotatable about a rotational axis in first and second rotational directions;
   said eccentric shaft including a fixed eccentric mass and a movable eccentric mass;
   said movable eccentric mass coacting with said fixed eccentric mass in said first rotational direction and partly balancing said fixed eccentric mass in said second rotational direction;
   said fixed eccentric mass having a section defining a maximal radial extension (UB) with respect to said rotational axis;
   said maximal radial extension (UB) being delimited by an imaginary arc-shaped curve having a diameter (D) and being defined by points and/or segments of the outer periphery of said fixed eccentric mass;
   said fixed eccentric mass defining a section plane perpendicular to said rotational axis and said section plane and said rotational axis conjointly defining an intersection point; and,
   said imaginary arc-shaped curve having a point (P) thereon coinciding with said intersection point or said point (P) being on said imaginary arc-shaped curve at a location closest to said intersection point at a distance $A \leq 0.1(D)$ therefrom.

2. The eccentric shaft assembly of claim 1, wherein said distance $A \leq 0.05(D)$.

3. The eccentric shaft assembly of claim 1, wherein said compacting machine has a drum and said eccentric shaft assembly is mounted in said drum; said fixed eccentric mass has a recess for accommodating said movable eccentric mass therein so as to cause any section thereof to be included within a projection of said imaginary arc-shaped curve when said eccentric masses coact with each other to cause the drum of the compacting machine to vibrate with a predetermined amplitude.

4. The eccentric shaft assembly of claim 3, wherein said movable eccentric mass is pivotally mounted about a pin shaft extending in the same direction as said rotational axis.

5. The eccentric shaft assembly of claim 4, wherein said eccentric shaft has respective ends defining respective diameters; and, said pin shaft has a diameter smaller than each of said diameters of said ends of said eccentric shaft.

6. The eccentric shaft assembly of claim 4, wherein said pin shaft defines a center axis offset and parallel to said rotational axis.

7. The eccentric shaft assembly of claim 4, wherein said pin shaft is mounted in said fixed eccentric mass.

8. The eccentric shaft assembly of claim 1, wherein said imaginary arc-shaped curve defines a circle.

9. A drum assembly for a compacting machine, the drum assembly comprising:
   an eccentric shaft rotatable about a rotational axis in first and second rotational directions;
   said eccentric shaft including a fixed eccentric mass and a movable eccentric mass;
   said movable eccentric mass coacting with said fixed eccentric mass in said first rotational direction and partly balancing said fixed eccentric mass in said second rotational direction;
   said fixed eccentric mass having a section defining a maximal radial extension (UB) with respect to said rotational axis;
   said maximal radial extension (UB) being delimited by an imaginary arc-shaped curve having a diameter (D) and being defined by points and/or segments of the outer periphery of said fixed eccentric mass;

said fixed eccentric mass defining a section plane perpendicular to said rotational axis and said section plane and said rotational axis conjointly defining an intersection point;

said imaginary arc-shaped curve having a point (P) thereon coinciding with said intersection point or said point (P) being on said imaginary arc-shaped curve at a location closest to said intersection point at a distance $A \leq 0.1(D)$ therefrom;

a drum for imparting vibration to a surface;

said drum having a gable end and a cassette mounted in said gable end;

said eccentric shaft having respective ends and being mounted in said cassette; and, said cassette having a set of bearings for rotatably mounting corresponding ones of said ends therein.

\* \* \* \* \*